April 12, 1938.  E. A. FREED  2,114,051
SELF ALIGNING BEARING
Filed Aug. 9, 1937
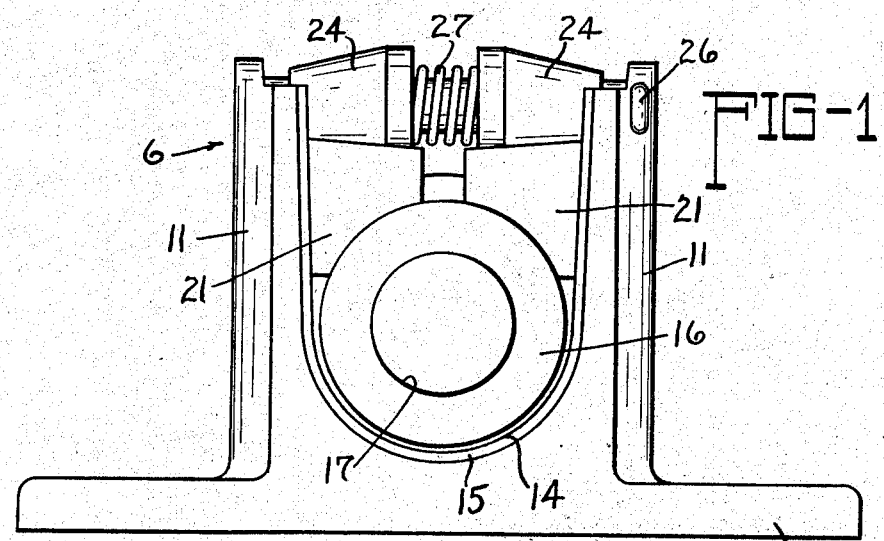
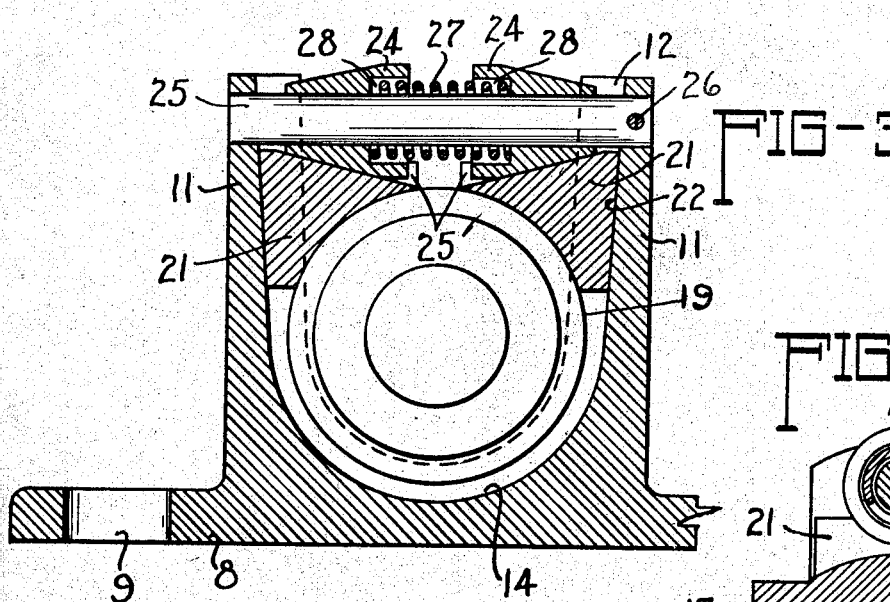
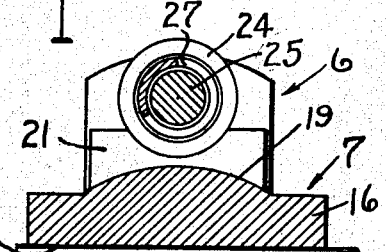
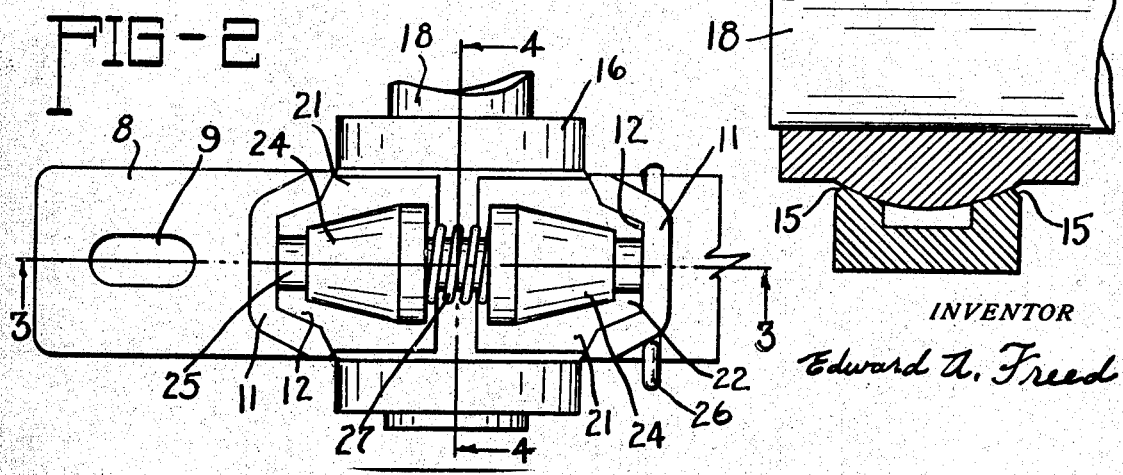
INVENTOR
Edward A. Freed Patented Apr. 12, 1938

2,114,051

UNITED STATES PATENT OFFICE 2,114,051

SELF ALIGNING BEARING

Edward A. Freed, Moline, Ill.

Application August 9, 1937, Serial No. 158,094

2 Claims. (Cl. 308—72)

My invention relates to self aligning bearings for shafts, of that general design of structure shown in my Patent 2,001,383 which issued under date of May 14, 1935, wherein the bearing is automatically adjusted by the shaft into axial alignment therewith.

The principal object of my present invention is to provide a type of self aligning bearing wherein the bearing sleeve is supported in the supporting bracket in such a manner that it may be easily adjusted angularly into the aligned position but secured against bodily movement relative to said bracket.

A further object is to provide a bearing structure of this kind which may be readily assembled and wherein the parts are securely held against displacement.

The foregoing and still further objects and advantages of the invention will become apparent to those skilled in the art after a study of the following specification, taken in conjunction with the accompanying drawing wherein like characters of reference designate corresponding parts throughout the several views, and wherein:—

Figure 1 is an elevational side view of the bearing structure;

Figure 2 is a fragmentary top plan view of the structure shown in Figure 1;

Figure 3 is a longitudinal vertical section taken substantially on the plane of line 3—3 of Figure 2 but showing the bearing sleeve and shaft in elevation; and, Figure 4 is a transverse vertical section taken on the plane of line 4—4 of Figure 2.

The bearing structure includes a supporting bracket 6 and bearing sleeve 7. The bracket 6 comprises a base 8 which is substantially rectangular and is provided, adjacent each end with apertures 9 adapted to receive retaining bolts (not shown) for securing the bracket in place. A pair of spaced parallel vertical side members 11 extend upwardly from the base 8. A vertical groove or guide 12 is provided on the inner side of each side member 11 for a purpose to be later described. A spherical socket 14 is formed on the base 8 between the side members 11 and is adapted to receive the bearing sleeve 7. The outer edge of the socket 14 is beveled slightly at 15 to provide clearance for the sleeve 7 to swing angularly.

The bearing sleeve 7 comprises a cylindrical member 16 having a central longitudinal bearing opening 17 to receive a shaft 18, a ball portion 19 is formed around the sleeve 7 intermediate the ends thereof and is adapted to engage the socket 14 of the supporting bracket 6.

The bearing sleeve 7 is held in operating position in engagement with the socket 14 by means of a pair of retaining blocks 21 which are disposed above the bearing sleeve in transversely spaced apart relation. A rib 22 is formed on the outer edge of each block 21 and is adapted to engage the groove 12 in the adjacent side member 11. The rib 22 serves to hold the block 21 in a vertical position and to prevent lateral displacement thereof. The lower surface of the block 21 is spherical and conforms to the outer surface of the ball 19 and engages therewith. The blocks 21 are held in engagement with the ball portion 19 by conical wedge members 24 which engage with outwardly and upwardly tapering grooves 25' formed on the upper side of the blocks 21. The wedge members 24 are slidably mounted on a pin 25 which is supported in aligned holes provided in the upper ends of the side members 11. The pin 25 is secured in this position by a cotter 26 which extends thru a hole in one end of the pin and thru aligning holes provided in the side member 11. The wedge members 24 are urged outwardly to engage the grooves 25' by a spring 27 disposed between the members. The ends of the spring 27 are seated in recesses 28 provided for this purpose in the inner ends of the wedge members 24 and is thus held against displacement.

The wedge members 24 acting against the blocks 21 serve to hold the bearing sleeve 7 in place against bodily displacement. At the same time, because of the ball and socket connection between the bearing sleeve 7 and the supporting bracket 6, the sleeve is permitted to move angularly into axial alignment with the shaft 18. Any tendency of the bearing sleeve 7 to move upwardly or longitudinally or laterally is prevented by the blocks 21 engaging against the wedge members 24. This result is obtained by reason of the particular angle of the groove 25' and the tension of the spring 27. The tension of the spring 27 and the angle of the grooves 25' are in such relation that any tendency of the sleeve 16 to move upwardly bodily is resisted as though it were pushing directly against the pin 25. It is, therefore, impossible for the bearing sleeve 16 to become displaced from the socket 14 through any upward pressure of the sleeve. A further advantage of this construction is that any wear which might occur between the sleeve 16 and the socket 14 will be automatically taken up by the action of the wedge members 24 against the blocks 21, since the members 24 are constantly urged outwardly in contact with the inclined grooves 25' by the spring 27. Therefore with my improved construction there can be no looseness or rattle while in normal service caused by natural wear of the several parts of the self aligning part of the bearing. This improved construction eliminates direct pressure against the springs or other resilient means as commonly used in conventional designs and provides for automatic adjustment to take up wear while also providing for automatic alignment—; also preventing bodily displacement of the bearing sleeve in the supporting means whenever the pressure against the spring as used in conventional constructions becomes greater than the spring tension.

From the foregoing it will be seen that I have constructed a self aligning bearing structure wherein the bearing sleeve may be angularly adjusted to any desired position and wherein the parts are so designed and arranged that no bodily movement of the bearing sleeve relative to the supporting bracket is permitted.

While I have described in connection with the accompanying drawing, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. A self aligning bearing comprising a supporting bracket having a socket, a bearing sleeve having a ball portion cooperating with said socket and adapted to permit said sleeve to move angularly relative to said bracket, and means for holding said ball portion in engagement with said socket in any adjusted position including a pair of retaining blocks, each said block having a spherical surface on its lower side to engage said ball portion and a beveled surface on the upper side, a pair of wedge members engaging the beveled surface of said retaining blocks, and a spring between said wedge members engaging both said members to automatically urge them apart and thereby to hold said members in locking engagement with said retaining blocks.

2. A self aligning bearing comprising a supporting bracket having a pair of spaced parallel side members, and a socket between said side members, a bearing sleeve having a ball portion cooperating with said socket and adapted to permit said sleeve to be adjusted angularly relative to said bracket, means for holding said ball portion in engagement with said socket in any adjusted position including a pair of retaining blocks having spherical surfaces on their lower sides to engage said ball portion and beveled surfaces on their upper side, a pin above said blocks and supported in said side members, a pair of wedge members mounted on said pin and engaging said beveled surfaces, and a spring between said wedges to automatically urge said wedges in opposite directions and against said blocks to hold said blocks in locking engagement with said ball portion.

EDWARD A. FREED.